G. D. MUNSING.
SPEED CHANGING MECHANISM.
APPLICATION FILED FEB. 6, 1909.
937,320.
Patented Oct. 19, 1909.
3 SHEETS—SHEET 3.
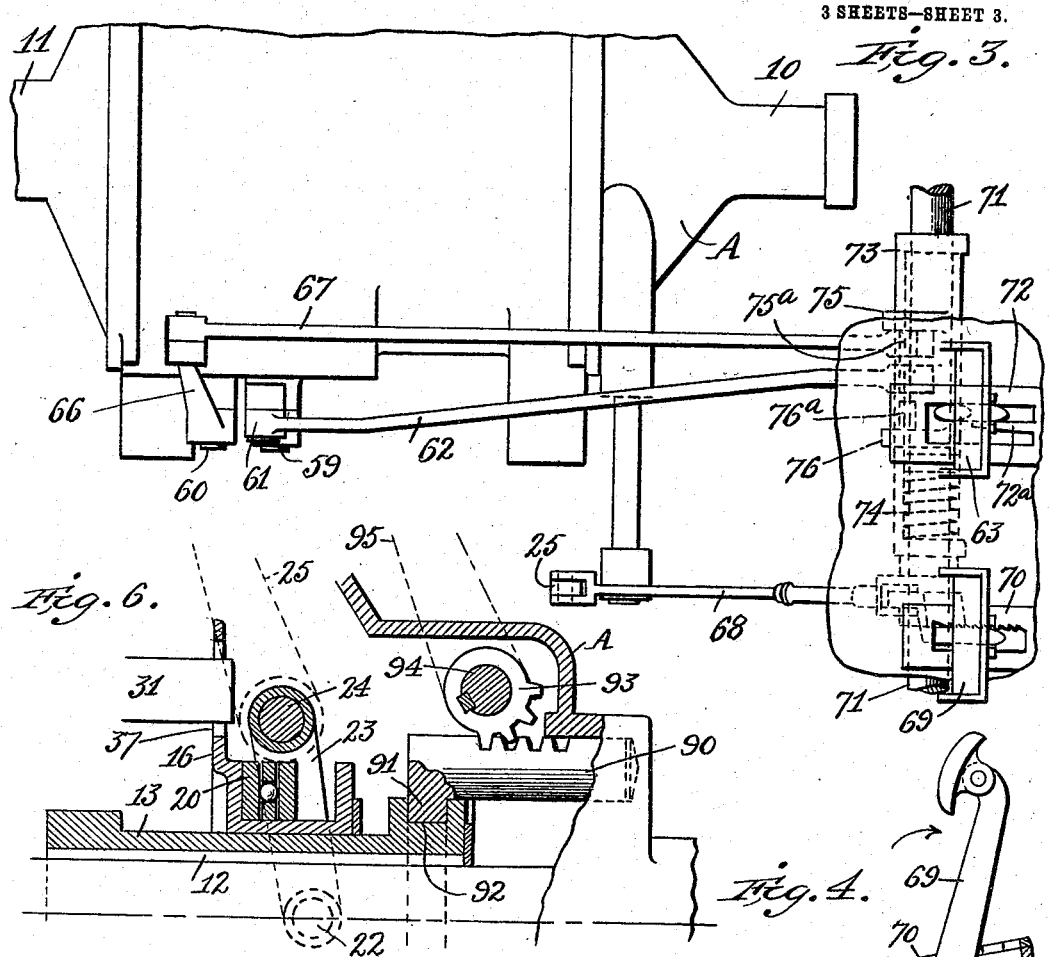
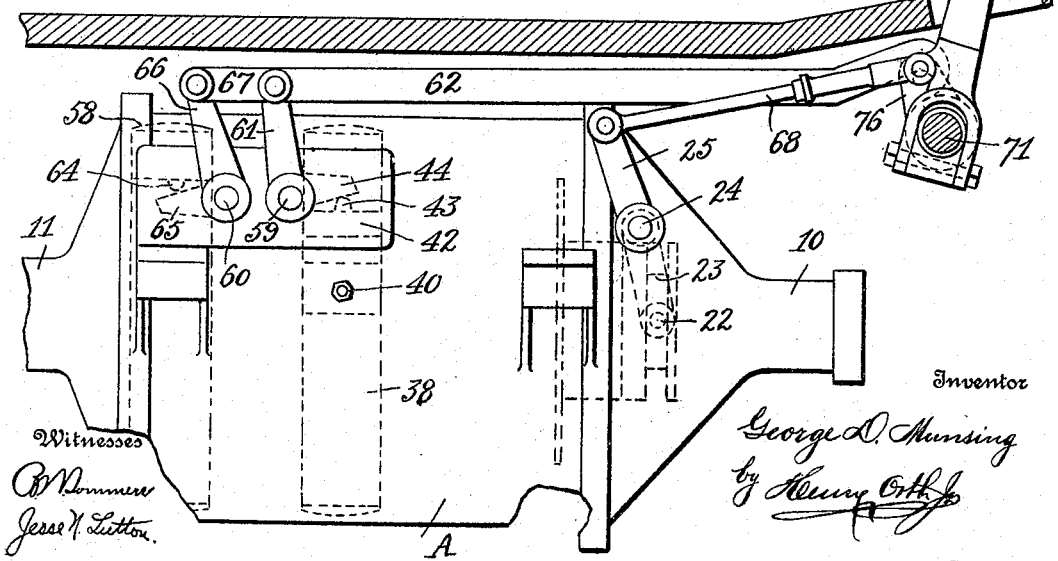

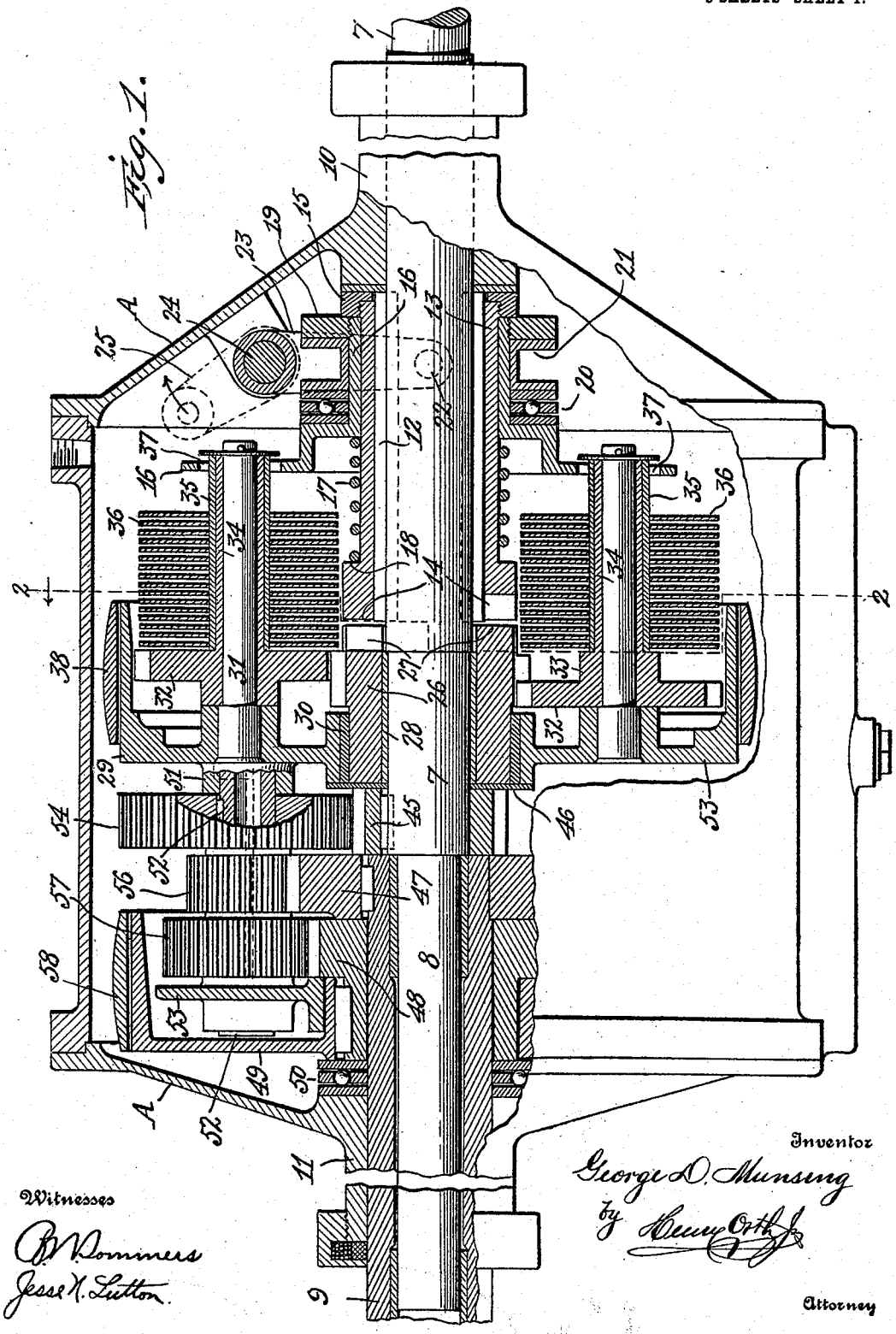

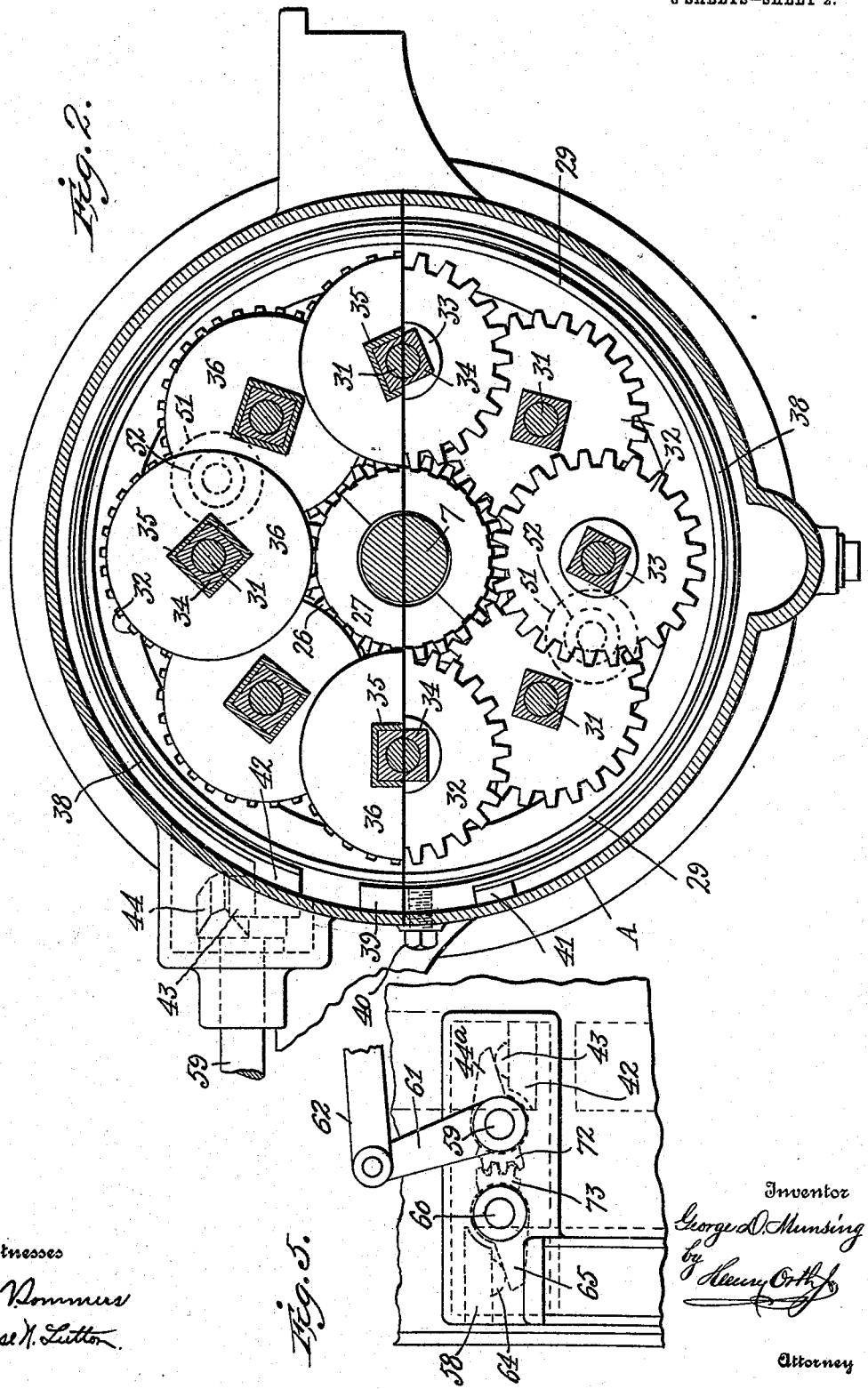

UNITED STATES PATENT OFFICE.

GEORGE D. MUNSING, OF HOBOKEN, NEW JERSEY.

SPEED-CHANGING MECHANISM.

937,320.  Specification of Letters Patent.  Patented Oct. 19, 1909.

Application filed February 6, 1909. Serial No. 476,401.

*To all whom it may concern:*

Be it known that I, GEORGE D. MUNSING, a citizen of the United States of America, residing at Hoboken, county of Hudson, State of New Jersey, United States of America, have invented certain new and useful Improvements in Speed-Changing Mechanisms; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to speed changing mechanisms being more especially adapted for motor vehicles and it has for its object a structure embodying interfitting sets of friction plates, each set of plates being capable of movement, specifically rotation, so as to readily and quickly release automatically, together with details of construction hereinafter to be described and claimed.

Referring to the drawings, in which like parts are similarly designated, Figure 1 is a vertical central section through the mechanism. Fig. 2 is a section on the line 2—2 of Fig. 1. Fig. 3 is a plan and Fig. 4 is an elevation showing an arrangement of levers for operating the mechanism. Fig. 5 is a modification whereby a single lever is used for operating the two brake bands and Fig. 6 is a vertical longitudinal section of a modification.

Referring more particularly to Fig. 1, 7 is the driving shaft having a reduced portion 8 extending into the driven shaft 9 which is bored to receive the reduced end of the driving shaft. Shaft 7 passes through a bearing 10 forming part of the casing A, while the shaft 9 passes through a similar bearing 11 at the opposite end of the casing A. Splines or feathers 12 secure to the driving shaft a longitudinally slidable clutch sleeve 13 provided with a clutch face 14 on one end and on the opposite end of the clutch sleeve 13 is a collar 15 against which is held a pressure plate 16 by a coil spring 17 located between the plate and a shoulder 18 on the clutch sleeve. A collar 19 on the boss of the pressure plate holds in place a thrust ball bearing 20 and a shifting collar 21, in the groove on which collar take the pins 22 of a shifting fork 23 secured to a shaft 24 and operated by a lever or crank 25 as is customary.

Loose on the driving shaft 7 is a gear wheel 26 provided with a clutch face 27 capable of being engaged by the clutch face of the sleeve 13. This gear wheel has between it and the shaft, preferably but not necessarily, a bushing 28 and mounted on the boss of this gear wheel and free to revolve thereon is a brake wheel 29 there being preferably, but not necessarily, a bushing 30 between the brake wheel and the boss of the wheel 26.

Mounted in the brake wheel 29 are a plurality of shafts 31, here shown as eight in number, which number can be varied as desired, and mounted loose on each shaft 31 are a number of gear wheels 32 having bosses 33, said bosses being slightly wider than the gear wheels whereby said gear wheels can be arranged to overlap one another, as is more clearly shown in Fig. 2. Formed in one piece with the gear wheels 32 or suitably secured thereto are extensions 34, having an angular external surface here shown as rectangular in section, see Fig. 2, and on these extensions are mounted rectangular bushings 35 on each of which is mounted a set of friction plates 36. The plates of one set alternate with the plates of the adjacent overlapping sets. The free ends of the shafts 31, their tubular extensions 34 and their bushings 35 extend freely through openings 37 in the compression plate 16 so that said plate will be free to compress or exert pressure on the disks.

On the external periphery of the brake wheel 29 is a brake band 38 more clearly shown in Fig. 2. This brake band 38 has an enlarged end 39 secured by a screw 40 to the casing A, said enlarged end abutting against a lug 41 in the casing and the free end of the band is also provided with an enlargement 42 having a round or semi-cylindrical portion 43 on which the lever 44 acts to force the free end of the band toward the fixed end and thereby force the band on the friction wheel, the movement being in the rotation direction of the brake wheel 29. Keyed to the driving shaft 7 is a pinion 45 separated from the loose gear wheel 26 by a plate or washer 46 and adjacent the hollow end of the driven shaft 9. The driven shaft 9 has keyed to it a gear wheel 47 and adjacent to this gear wheel is a loose gear wheel 48 having keyed to its boss a second brake wheel 49 and between the brake wheel and gear wheel 48 on the one end and the bearing 11 for the driven shaft 9, is a thrust ball bearing 50.

On the loose brake wheel 29 there are two bosses 51 the relative positions of each being indicated in dotted lines in Fig. 2 and mounted at one end in each boss is a shaft 52 whose other end is secured in a spider or support 53 free to rotate on the hub of the brake wheel 49. On each shaft 52 between the boss 51 and the spider or support 53 is a gear wheel 54 meshing with the pinion 45 keyed to the driving shaft, a pinion 56 meshing with the wheel 47 keyed on the driven shaft and a wheel 57 meshing with the wheel 48 keyed to the brake wheel 49. This brake wheel 49 is provided with a brake band 58 similar in structure to the brake band 38.

Projecting through the casing A, Fig. 4 are two short shafts 59 and 60. The one 59 is provided with a lever arm 44 inside the casing that engages the cylindrical projection 43 on the free end 42 of the brake band 38 and the shaft 59 is also provided with a lever arm 61 pivotally connected to a rod 62 operable from a pedal 63. The other brake band 58 has on its free end a similar cylindrical projection 64 engaged by a lever 65 inside the casing and that secured to the short shaft 60, which shaft is connected by an arm 66 to a rod 67 also operated from the pedal 63. The arm 25 for operating the yoke to move the clutch and pressure plate is connected by an adjustable rod 68 to a pedal 69 capable of being held in proper position by means of a notched or toothed plate 70. Two pedals 63 and 69 are mounted on a shaft 71. The pedal 63 operates in plate 72 having a central tongue 72ª and is connected to a sleeve 73 urged by a spring 74 both on shaft 71. This sleeve has two lugs 75 and 76 having lateral projecting pins 75ª and 76ª over which the hooked ends of the draw rods 67 and 62 are capable of being hooked. When the pedal is moved from one side of the tongue 72ª to the other, sleeve 73 is shifted longitudinally of the shaft 71 so that one pin 75ª or 76ª will engage the end of its adjacent draw rod while the other pin is simultaneously disengaged from its draw rod.

The operation of the mechanism is as follows: When the parts are in the positions shown in Fig. 1, and Fig. 4, the mechanism runs idle and the engine is free to rotate without load. By clamping the brake band 38 with the friction disks released, the car will start forward at a low speed being driven through the gears 45, 54, 56 and 47 and the driven shaft 9. By releasing the brake band 38 and starting the compression of the disks the speed can be increased to the maximum speed. This is done when the pedal 69 is moved in the direction of the arrow, Fig. 4. It pulls over the crank arm 25 thereby causing the yoke 19 to move the pressure plate 16 against the friction plates 36 and in doing so compresses the spring 17 which acting against shoulder 18 on the sleeve clutch 13 causes the clutch to move into engagement with the loose gear wheel 26 and rotate this gear wheel at engine speed. This gear wheel in turn drives the planet gear wheels 32 on the brake wheel 29 which in turn drives the friction plates and as the friction plates of one set alternate with those of its two adjacent sets the friction plates are simultaneously rotated. The contacting parts of said plates being moved in opposite directions, they tend to reduce the speed of rotation or hold the planet wheel against rotation thereby tending to lock the brake wheel 29 and cause it to tend to rotate in unison with the gear wheel 26 and the driving shaft 7. The amount of slip between the coacting sets of friction plates and consequently the degree of rotation of the planet wheels 32 will determine the speed of rotation of the brake wheel 29. The area of contact between adjacent overlapping plates is constant from the lowest to the highest speed, i. e., under all conditions of operation, the amount of friction from low speed to high speed being controlled by the varying pressure tending to compress the plates. The friction plates are thin and perfectly flat, and by reason of one set overlapping the plates of the coöperating set at a portion of the path of revolution of the plates, there is but a proportionately small area of frictional contact between adjacent plates, which is constantly being changed or shifted, thus allowing any one portion of the plates plenty of time to cool before coming into frictional engagement again upon the completion of the rotation. Should the pressure on the plates 36 be sufficient to frictionally lock them together then the brake wheel 29, gear wheels 26, 54, 56 and 57 will rotate as a unit about the center of the driven shaft and the driving shaft will rotate in a forward direction at engine speed. By releasing the disks and the brake band 38 and applying the brake band 58, the driven shaft 9 will be reversed by reason of the gear wheel 48 being held stationary and the planet gears 57, 56, and 54 being driven from the pinion 45 of the driving shaft, the wheel 56 transmitting the motion during its planetary movement, to reverse the direction of movement of the pinion 47 keyed to the driven shaft.

The structure embodying the oppositely rotating interfitting sets of friction plates is of particular importance, for their clutching action and frictional effects are always reliable and what is more important they will release automatically as soon as the compressor 16 is moved away from them, and the release is always reliable and rapid so that the disks follow the movement of the compressor.

In Fig. 5, I have shown a structure dispensing with the arm 66 and connecting rod 67, and to this end the shaft 59 has secured to it, the lever 44$^a$ provided on the opposite side of shaft 59 with a toothed sector 72 that gears with a similar sector 73 on the adjacent shaft 60, said sector 73 being part of the lever 65 for operating the second brake band 58, so that when one brake band is applied the other is simultaneously released.

In Fig. 6 I have shown a modification in which the clutch sleeve 13 is shifted on the driving shaft independently of the compressor plate and to this end the sleeve is provided with a groove or shaft collar 92 into which takes a lug 91 on a rack 90 operated by a toothed sector 93 keyed to a shaft 94 operated by a separate lever 95.

I claim:

1. In a speed changing mechanism, the combination with the driven and driving shafts, of a gear wheel and a brake wheel, both free to rotate with respect to the driving shaft, means to drive the gear wheel from the driving shaft, planet gear wheels mounted in said brake wheel and gearing with the said gear wheel, a set of friction disks mounted to rotate in unison with each planet gear wheel, the disks of one set overlapping and alternating with those of an adjacent set, means to exert pressure on the friction disks, a pinion on the driving shaft and a gear wheel on the driven shaft, and planet mechanism connected to the brake wheel and between said gear wheel and pinion.

2. In a speed changing mechanism, the combination with the driven and driving shafts, of a gear wheel and a brake wheel, both free to rotate with respect to the driving shaft, means to drive the gear wheel from the driving shaft, planet gear wheels mounted in said brake wheel, a set of friction disks mounted to rotate in unison with each planet gear wheel, the friction plates of each set coöperating and alternating with those of each adjacent set, means to exert pressure on the friction plates and planet gearing on the brake wheel and geared to the driving and driven shafts.

3. In a speed changing mechanism as a component of said mechanism planet gear wheels, a set of friction disks loosely mounted on each gear wheel, the disks of one set alternating with the disks of an adjacent set, the disks of adjacent sets overlapping whereby opposite directions of movement are imparted to the overlapping portions.

4. In a speed changing mechanism the combination with the driving shaft of said mechanism, of a gear wheel and a brake wheel, both loose on the driving shaft, planet gear wheels gearing with the loose gear wheel, friction plates rotated in unison with the planet gear wheels, a friction plate presser and a clutch member slidable but not rotatable on the driving shaft to engage the loose gear wheel and cause it to rotate in unison with the driving shaft when the presser is brought into action.

5. In a speed changing mechanism, the combination with the driving shaft of said mechanism; of a gear wheel having a clutch face and a brake wheel both loose on the shaft, planet gear wheels gearing with the loose gear wheel, sets of overlapping friction plates mounted to rotate in unison with the planet gear wheels, a clutch sleeve slidable but not rotatable on the shaft, a friction plate presser free to rotate with respect to the clutch sleeve, a yielding connection between the clutch sleeve and presser and means to move the presser to and from the friction plates.

6. In a speed changing mechanism, the combination with the driving shaft, a brake wheel free to rotate with respect to the shaft and means to drive the brake wheel including friction mechanism carried by said wheel; of a pinion fixed on the shaft, a driven shaft, planet gearing mounted on the brake wheel and meshing with said pinion and geared to the driven shaft.

7. In a speed changing mechanism, the combination with the driving shaft, of a gear wheel and a brake wheel free to rotate with respect to the shaft, a clutch to clutch the gear wheel to the shaft, friction mechanism carried by the brake wheel and driven from the gear wheel, a pressure plate; a pinion fixed on the shaft, a driven shaft, a gear wheel loose thereon, a brake wheel secured to said gear wheel, a gear wheel secured to the driven shaft, and a set of three planet gear wheels carried by the first brake wheel and gearing respectively with the pinion on the driving shaft, the gear wheel fixed to and the gear wheel loose on the driven shaft.

8. In a speed changing mechanism a plurality of sets of friction plates, the plates of one set alternating with and overlapping the plates of an adjacent set and means to rotate the friction plates about their centers, whereby the overlapping portions of the plates will move in opposite directions.

9. In a speed changing mechanism, a plurality of sets of friction plates mounted planetwise on a rotatable supporting member, the plates of one set alternating with and overlapping those of an adjacent set and means common to all the sets of plates to rotate the plates about their centers.

10. In a speed changing mechanism, the combination with the driving shaft, a pinion thereon and brake wheed free to rotate with respect to the driving shaft; of a driven shaft having a gear wheel fixed thereon and a gear wheel loose thereon, a brake wheel loose on the driven shaft and planet wheels free to rotate, carried by the first brake wheel, said planet wheels meshing with the aforesaid gear wheels and pinion and means to brake the second brake wheel.

11. The combination with a set of friction plates, of a second set of rotatable, completely revoluble friction plates in frictional engagement with the first set.

12. The combination with a set of friction plates; of a second set of friction plates rotatable on their axes, overlapping and alternating with the first mentioned set of friction plates, a driving shaft, mechanism between the driving shaft and rotatable friction plates to rotate the latter, and a clutch to connect said mechanism with the driving shaft and disconnect it therefrom.

13. The combination with a driving shaft, a gear wheel loose thereon and a clutch to clutch said wheel to the shaft; of a rotatable support, a plurality of planet gear wheels mounted planet wise in the support and gearing with the aforementioned gear wheel, said gear wheels having bosses longer than their faces and being staggered with respect to the wheel with which they mesh, thereby overlapping one another and sets of overlapping alternating friction plates rotated by the planet gear wheels.

14. In a speed changing mechanism, the combination with two alined shafts; of a wheel on and loose with respect to one of the shafts, means to connect said wheel to said shaft, a pinion on said shaft, a brake wheel loose with respect to the other shaft, a gear wheel secured to said brake wheel and a gear wheel on said other shaft and three planet wheels mounted on said wheel and meshing respectively with the pinion on the first shaft and the gear wheels on the second shaft and on the brake wheel and means to brake said brake wheel.

15. In a speed changing mechanism, the combination with two alined shafts; of a wheel on and loose with respect to one of the shafts, means to connect said wheel to its shaft including mechanism to permit a slip between the two, a pinion secured to said shaft, a brake wheel on and loose with respect to the other shaft, a gear wheel secured to said brake wheel and a gear wheel on said other shaft and three planet wheels mounted on said wheel and meshing respectively with the pinion on the first shaft and the gear wheels on the second shaft and on the brake wheel, and means to brake said brake wheel.

16. In a speed changing mechanism, the combination with alined shafts; of a brake wheel on and loose with respect to one of them, a second brake wheel on and loose with respect to the second shaft, a pinion on the first shaft, a gear wheel on the second brake wheel and a gear wheel on the second shaft, planet wheels mounted on the first brake wheel and meshing respectively with said pinion and gear wheels, brake bands for said brake wheels and means common to both brake bands to alternately operate them.

17. The combination with a set of friction plates; of a second set of rotatable friction plates over-lapping and coöperating with the first mentioned set of friction plates at a portion of their path of rotation and having areas of frictional contact invariable during various conditions of operation and means to revolve the plates.

18. In a transmission mechanism a plurality of rotatable brake wheels, planet mechanism between them, a separate brake device for each wheel, a single lever a single connecting rod and mechanisms between the rod and brake devices for separately and alternately applying the brake devices.

19. The combination with a set of friction plates; of a second set of friction plates rotatable on their axes and overlapping, alternating with and eccentric to the first mentioned set of friction plates and a follower to vary the compression of the plates of both sets and thereby control the friction between them.

20. The combination with a set of axially slidable friction plates; of a second set of axially slidable friction plates rotatable on their axes and overlapping, alternating with and eccentric to the first mentioned set of friction plates, a follower to compress the plates of both sets and hand-operated means to actuate the follower and thereby control the friction between the plates.

21. The combination with a movable support; of a plurality of sets of friction plates mounted on the support, the plates of one set overlapping and alternating with the plates of an adjacent set, means to rotate the plates about their centers, a follower movable in unison with the support and means to control the pressure exerted by the follower on the plates.

22. The combination with a set of axially slidable friction plates; of a second set of axially slidable, rotatable, and completely revoluble friction plates in frictional engagement with the first set and a follower.

In testimony that I claim the foregoing as my invention, I have signed my name in presence of two subscribing witnesses.

GEORGE D. MUNSING.

Witnesses:
 JAMES H. WESTCOTT,
 HENRY ORTH, Jr.